(12) United States Patent
Vijayrao et al.

(10) Patent No.: US 6,820,106 B1
(45) Date of Patent: *Nov. 16, 2004

(54) METHOD AND APPARATUS FOR IMPROVING THE PERFORMANCE OF A FLOATING POINT MULTIPLIER ACCUMULATOR

(75) Inventors: Narsing K. Vijayrao, Santa Clara, CA (US); Chi Keung Lee, San Jose, CA (US); Sudarshan Kumar, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 631 days.

This patent is subject to a terminal disclaimer.

(21) Appl. No.: 09/604,620

(22) Filed: Jun. 27, 2000

(51) Int. Cl.[7] .................................................. G06F 7/38

(52) U.S. Cl. ...................................... 708/497; 708/501

(58) Field of Search .............................. 708/496, 497, 708/498, 499, 501, 503, 505, 523, 550, 551, 552

(56) References Cited

U.S. PATENT DOCUMENTS 6,199,089 B1 * 3/2001 Mansingh ................... 708/497

OTHER PUBLICATIONS

Quach, Nhon T. and Flynn, Michael J., *An Improved Algorithm for High–Speed Floating–Point Addition*, Technical Report No. CSL–TR–90–442, Computer Systems Laboratory, Stanford University, Stanford, Calif., Aug. 1990, pp. 1–16.

* cited by examiner

Primary Examiner—Chuong D Ngo
(74) Attorney, Agent, or Firm—Blakely, Sokoloff, Taylor & Zafman LLP

(57) ABSTRACT

A method and apparatus to increase the performance of a floating point multiplier accumulator (FMAC). The method comprises receiving three floating point numbers and computing a product of the first floating point number and the second floating point number and adding a third floating point number to produce a sum value and a carry value. A propagate value, a kill value and a generate value are then computed based on the sum value and the carry value. Simultaneously the sum value is added to the carry value to create a first result, the sum value is added to the carry value and incremented by one to create a second result, the sum value is added to the carry value and incremented by two to create a third result, and a decimal point position is determined. One of the first result, the second result and the third result is then selected responsive to a rounding mode and the decimal point position. The selected result is normalized based on the decimal point position. The apparatus comprises a multiplier with a propagate, kill, generate generator (PKG generator) coupled to it. An adder, a plus-oner, a plus-two-er and a leading zero anticipator (LZA) are each coupled to the PKG generator in parallel. A rounding control unit is coupled to the LZA and coupled to a multiplexor that outputs a result from one of the adder, the plus-oner, and the plus-two-er responsive to the rounding control unit. A normalization shifter is coupled to the multiplexor and the LZA.

23 Claims, 4 Drawing Sheets

METHOD AND APPARATUS FOR IMPROVING THE PERFORMANCE OF A FLOATING POINT MULTIPLIER ACCUMULATOR

BACKGROUND

1. Field of the Invention

The present invention relates to the field of computer processors and floating point mathematical support in computer processors. More specifically, this invention relates to improving the performance of a floating point multiplier accumulator.

2. Background

Computers are ubiquitous in modern society. Computers are regularly used for complex mathematical renderings required by modern computer graphics demands as well as traditional accounting, architecture and other specialized mathematically intensive application programs. Mathematical computations which require vary large numbers, require high precision, and/or include complex mathematical equations are referred to as floating point calculations. When programming software, floating point numbers are used when performing floating point calculations. Floating point numbers are commonly defined as having three parts: a sign, a significand (also known as a mantissa), and an exponent. A well known standard that sets a framework for how floating point numbers and calculations should be implemented is I.E.E.E. standard 754 (1985, reaffirmed 1990), the Standard for Binary Floating point Arithmetic, available from the Institute of Electrical and Electronics Engineers, Inc., 445 Hoes Lane, Piscataway, N.J. 08855-1331 (the I.E.E.E. Floating point Standard).

Floating point support has been implemented in a number of ways with processors. In earlier personal computers, a floating point co-processor was optionally available to be installed with and to assist a processor in handling floating point calculations (e.g., Intel Corporation provided a Numeric Processor Extension chip named the 8087 to accompany the widely used 8086 processor). As personal computers have evolved, processors have incorporated floating point capability within a processor by including one or more floating point units in a processor.

Traditionally, only specialized scientific and accounting application programs accessed a processor's floating point capabilities. However, today, colorful graphic and multimedia images are in widespread use in, for example, internet web pages, architectural software applications, computer games, and animation creation programs. Further, the use of Digital Video Disks (DVD) and the impending on-demand download of video presentations such as movies will cause increased usage of floating point capabilities of processors in computers and more specialized viewing devices. In all of these uses, images are stored in various compressed or encoded formats. The more detailed and higher resolution an image is, the more floating point calculations are needed to process (i.e., decompress or decode) and render the image for display on a monitor or other image generating device. As the use of graphic images has become popular and continues to grow, the use of a processor's floating point mathematical capabilities has been increasing. In addition, many other computer and processor uses, including use for audio processing, are also contributing to an increased use of a processor's floating point mathematical capabilities. To accommodate these and other needs, and to meet the ever growing demand for increased floating point performance, the floating point capability of processors is continually evolving. Any incremental increase in floating point throughput will increase the throughput of processors, computers, viewing devices, and any other systems utilizing the floating point capabilities of a processor.

DETAILED DESCRIPTION

Floating point numbers are implemented in a limited bit space, often in 32, 64, and 128 bit widths. Whenever computations are performed on floating point numbers, the bit width of the significand may be exceeded. For ease of reference, the bits beyond the designated significand bit width are described herein as "fallout" bits. Depending on the selected rounding mode and the fallout bits, the result of the computation may have to be modified by rounding. The discussion and invention herein involves the processing and computation of the significand portion of floating point numbers. For ease of reference, the term floating point number is used even though the significand is what is being acted on.

A floating point multiplier accumulator (FMAC) by definition receives as input three floating point numbers, (A, B and C, and produces (A×B+C) as a result. In traditional, prior art systems, an FMAC processes (A×B+C) to create what is known as SUM and CARRY, adds SUM and CARRY, shifts or normalizes the result, and then performs rounding. According to the present invention, to increase performance of an FMAC, when the SUM and CARRY are added together, the resulting sum, the resulting sum plus one, and the resulting sum plus two are computed in parallel so that the value necessitated by any needed rounding is computed in advance of the traditional rounding step. According to the present invention, the appropriate result is then chosen according to the rounding mode and normalized. In one embodiment, this method reduces the number of clock cycles needed for an FMAC to complete its execution by one. That is, in one embodiment, one clock cycle is saved by the use of the apparatus and method of the present invention. Although one clock cycle alone is a small amount of time, with the ever increasing use of floating point calculations and concomitant reliance on the floating point capabilities of processors, a nontrivial increase in overall processor performance results. In addition, only a minimal increase of on-chip hardware is required to accomplish the method and achieve the performance improvement.

Figure 1:
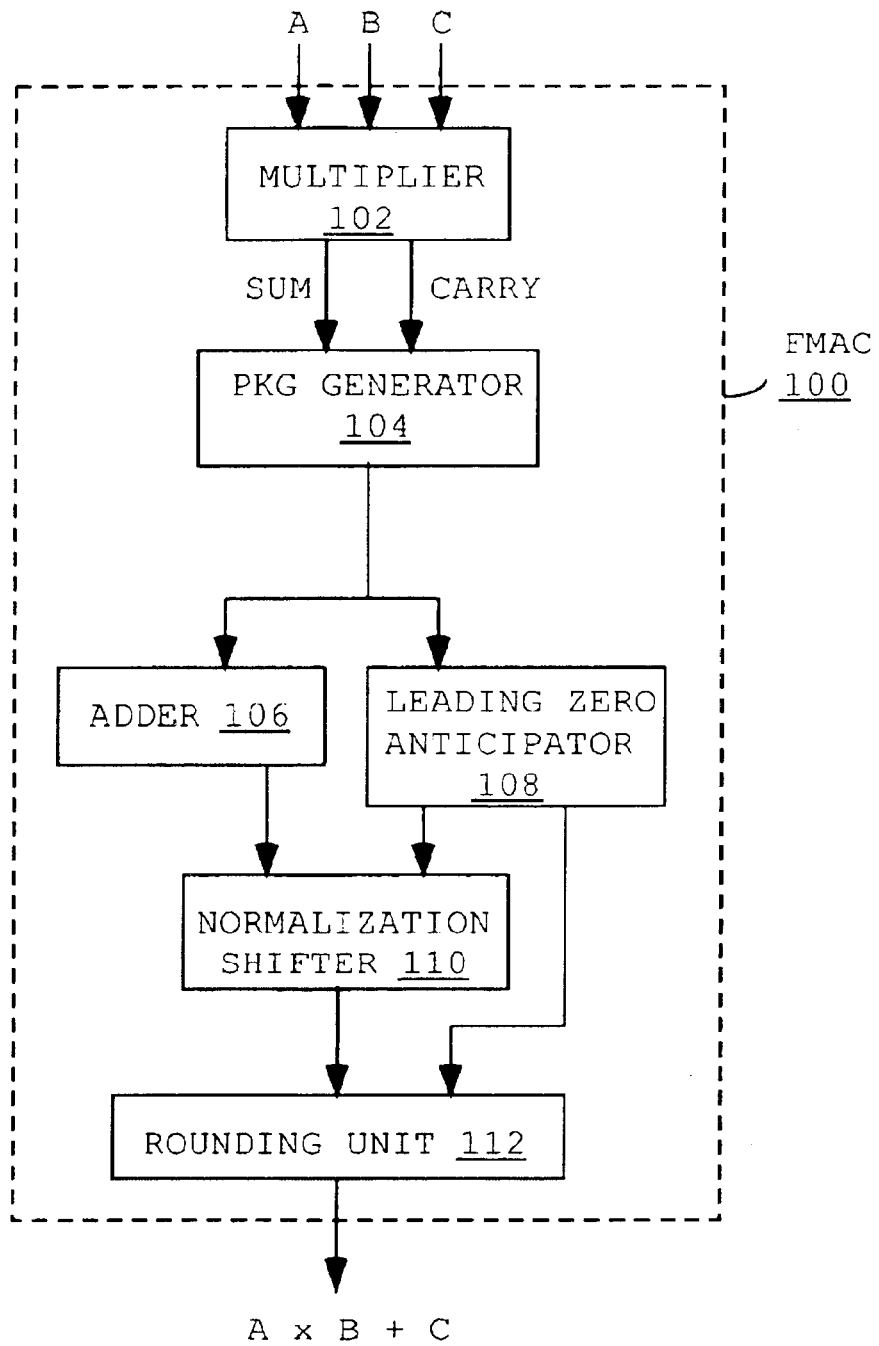
FIG. 1 depicts a prior art floating point multiplier accumulator.

FIG. 1 depicts a prior art floating point multiplier accumulator. Floating point multiplier accumulator (FMAC) 100 receives as input floating point numbers A, B, and C. The FMAC outputs the properly rounded result of "(A×B+C)" based on the rounding mode. Multiplier 102 receives A, B and C and outputs what is known as SUM and CARRY. Propagate, kill, generate (PKG) generator 104 is coupled to multiplier 102 and receives SUM and CARRY. Using SUM and CARRY, the PKG generator produces (1) P, the product of A and B, (2) G, the sum of A and B, and (3) K, the product of the one's complement of A and the one's complement of B. That is:

$$P = A + B$$

$$G = A \times B$$

$$K = \text{complement}(A) \times \text{complement}(B)$$

Adder 106 is coupled to the PKG generator and receives as input P, K and G and uses P, K and G to determine the sum of SUM and CARRY. Leading zero anticipator (LZA) 108 is also coupled to the PKG generator and receives P, K and G from the PKG generator. Normalization shifter 110 receives as input the result from adder 106 and the position of the decimal point from leading zero anticipator 108. Rounding unit 112 receives the normalized result from normalization shifter 110, and then increments, decrements or leaves unaffected the normalized result, depending on the rounding mode. The rounding mode is determined by, in one embodiment, reading the contents of a well-known register in the processor. The rounding mode is one of the rounding modes provided for in the I.E.E.E. Floating Point Standard. Pursuant to this standard, the rounding mode may be round toward positive infinity, round toward negative infinity, round toward zero, and round toward nearest. In one prior art embodiment, rounding in the form of incrementing or decrementing requires at least one clock cycle. In this prior art implementation, the total time for the FMAC processing includes the time needed to sequentially perform SUM plus CARRY addition and in adder 106 then perform rounding in rounding unit 112, if needed.

Figure 2:
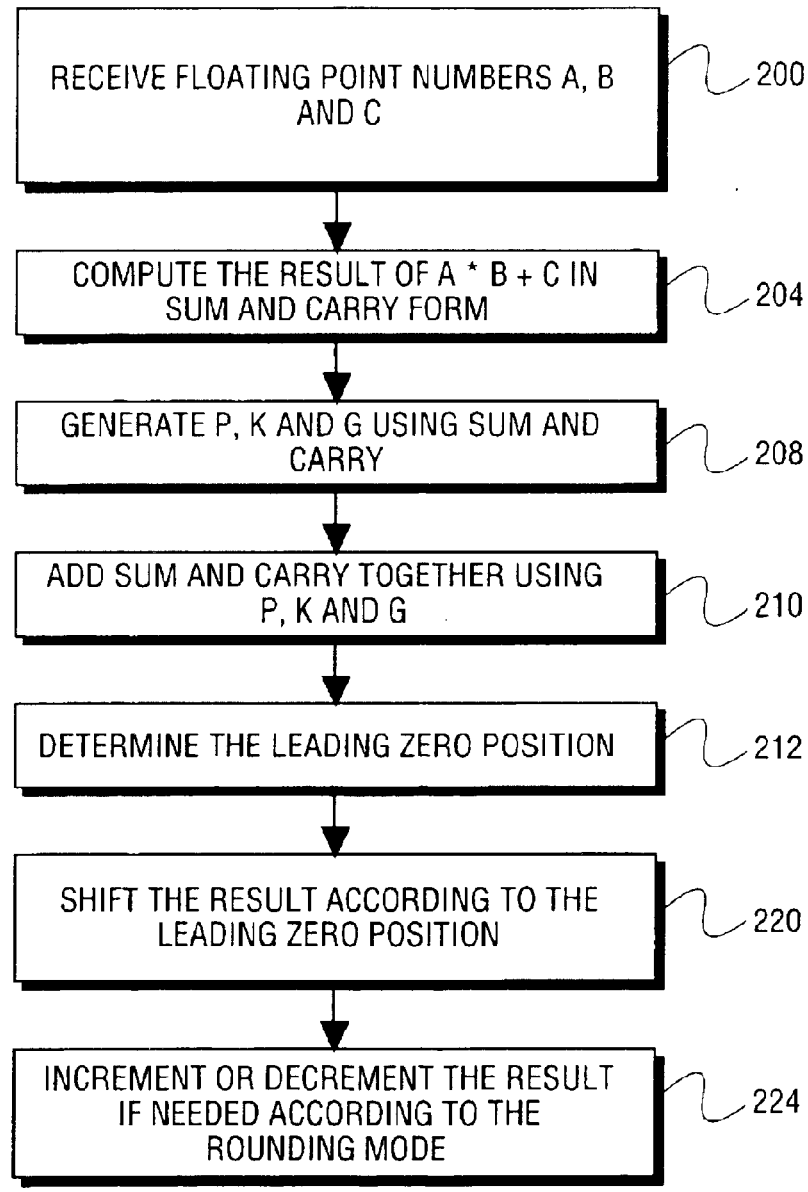
FIG. 2 depicts the flow of actions taken according to a prior art method of implementing a floating point multiplier accumulator.

FIG. 2 depicts the flow of actions taken according to a prior art method of implementing a floating point multiplier accumulator. The prior art FMAC receives three floating point numbers designated as A, B and C as input, as shown in block 200. A×B+C is then computed in SUM and CARRY form, as shown in block 204. P, K and G are then generated using SUM and CARRY, as shown in block 208. SUM and CARRY are then added using P, K, and G, as shown in block 210. The position of where the decimal point is located is then determined by the leading zero anticipator, as shown in block 212. The result, A×B+C, is then shifted according the result of the leading zero determination, as shown in block 220. The shifted result is then incremented or decremented, if needed, according to the rounding mode, as shown in block 224. In this prior art method, the adding SUM and CARRY and the determination of the leading zero may be performed in parallel. As mentioned above, in this prior art method, the total time for FMAC processing includes the time required to sequentially perform multiplication, generate P, K and G, perform addition, normalize and to perform rounding, if needed.

Figure 3:
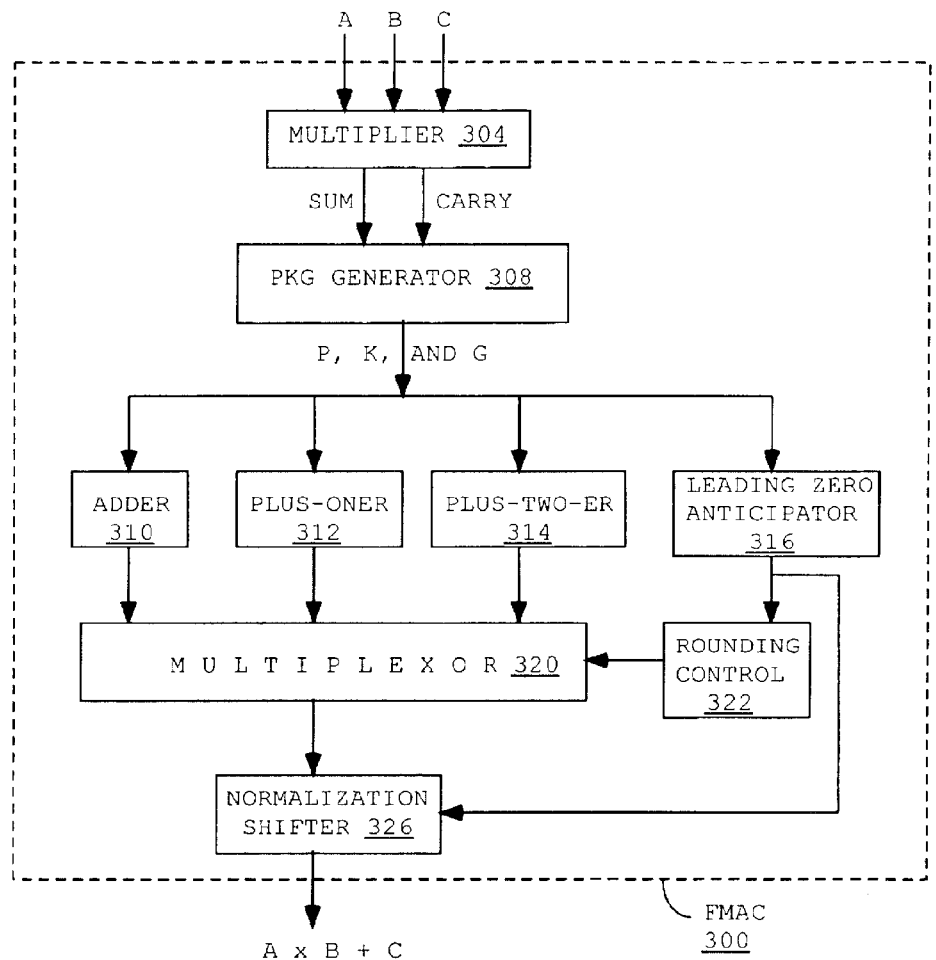
FIG. 3 depicts one embodiment of a floating point multiplier accumulator according to the present invention.

FIG. 3 depicts one embodiment of a floating point multiplier accumulator according to the present invention. Floating point multiplier accumulator (FMAC) 300 receives as input floating point numbers A, B, and C. Multiplier 304 receives A, B and C, produces A×B+C and outputs the result in SUM and CARRY form. Propagate, kill, generate (PKG) generator 308 is coupled to multiplier 304 and receives the SUM and CARRY as input. The PKG generator produces P, K, and G using SUM and CARRY, and may be the same PKG generator as in the prior art. Adder 310, plus-oner 312, plus-two-er 314, and leading zero anticipator 316 are coupled to PKG generator 308 and all receive P, K, and G as input. Adder 310 uses P, K and G to add SUM and CARRY. Plus-oner 312 uses P, K and G to add SUM and CARRY and increment the resulting sum by one. Plus-two-er 314 uses P, K and G to add SUM and CARRY and increment the resulting sum by two. Leading zero anticipator (LZA) 316 determines the location of the decimal point of the result by computing a leading zero position. Multiplexor 320 receives the result of each of adder 310, plus-oner 312, and plus-two-er 314 and selects which of the results is appropriate responsive to a control signal received from rounding control 322. Rounding control 322 issues an appropriate signal responsive to the rounding mode and the output of leading zero anticipator 316. The rounding mode may be obtained from, in one embodiment, a register in the processor. Normalization shifter 326 receives as input the appropriate sum selected by multiplexor 320. According to this method, the prior art steps of adding followed by rounding are effectively achieved in parallel by the computations accomplished by adder 310, plus-oner 312, plus-two-er 314, multiplexor 320, and rounding control 322. That is, the prior art rounding hardware is replaced with multiplexor 320, and rounding control 322 which complete their execution in less time than traditional rounding, and, thus take the resulting FMAC requires less time to complete its computation. This results in a relatively small increase in hardware required on the processor while increasing floating point computation throughput by, in one embodiment, one clock cycle.

Figure 4:
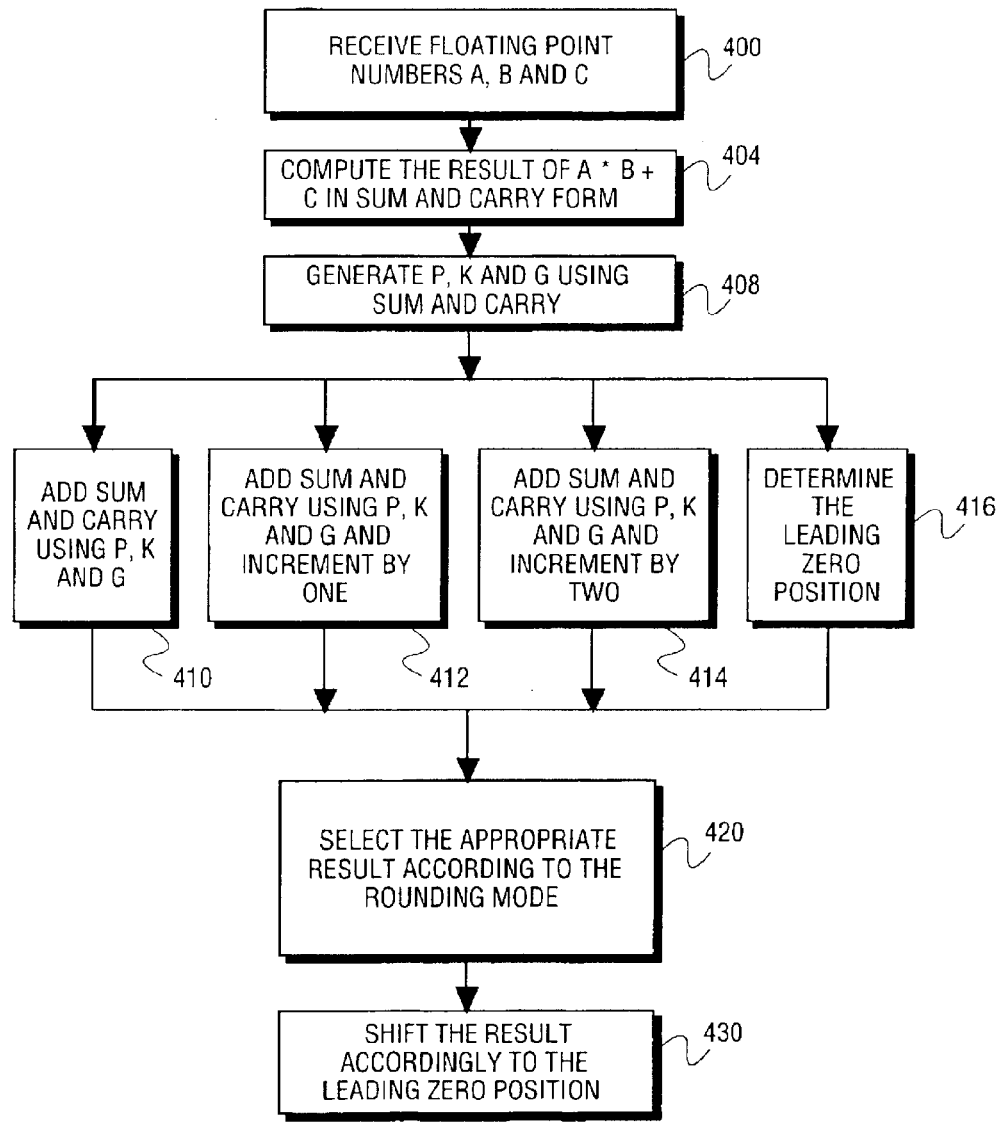
FIG. 4 depicts the flow of actions taken according to the method of implementing a floating point multiplier accumulator according to the present invention.

FIG. 4 depicts the flow of actions taken according to the method of implementing a floating point multiplier accumulator according to the present invention. The FMAC receives three floating point numbers designated as A, B and C as input, as shown in block 400. A×B+C is then computed in SUM and CARRY form, as shown in block 404. P, K and G are then generated, as shown in block 408. PKG generator 408 may be the same as the PKG generator used in prior art systems. Four operations then occur in parallel: (1) SUM and CARRY are added together using P, K and C, as shown in block 410; (2) SUM and CARRY are added together using P, K and G and the resulting sum is then incremented by one, as shown in block 412; (3) SUM and CARRY are added together using P, K and G and the resulting sum is then incremented by two, as shown in block 414; and (4) the location of the decimal point is made by determination of the position of leading zeros, as shown in block 416. The appropriate result of blocks 410, 412, and 414 is then selected according to the rounding mode and the position of the leading zero, as shown in block 420. In one embodiment, the rounding mode may be determined by examination of a register in the processor in which the FMAC resides. The result is then normalized according the outcome of the leading zero determination, as shown in block 430. By determining the result of the addition, the addition with incrementing by one, and the addition with incrementing by two, all of the possible results responsive to the rounding mode are predetermined. To appropriately round the result, the appropriate value produced by blocks 410, 412 and 414 in parallel is selected, eliminating the time consuming two step adding and rounding sequence taught in the prior art. As rounding is often necessary, the selection of the result responsive to the rounding mode saves time and increases throughput, particularly when performing numerous floating point computations.

Although the method and apparatus described above are resident in a processor, the method may also be implemented in software and microcode in those processors that allow and provide for such an implementation. Such software may reside within a processor, in cache memory, in random access memory, etc. In addition, such software may be read by the processor during boot up as part of a basic input output system (BIOS) or similar startup sequence and may be read from a hard disk, floppy disk, stick memory device, programmable read only memory (PROM), flash memory, or any other kind of machine readable medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A significand portion of a floating point multiply accumulator (FMAC) comprising:
   multiplier receiving a first input significand, a second input significand, and a third input significand;
   a propagate, kill, generate generator (PKG generator) coupled to the multiplier;
   an adder, a plus-oner, a plus-two-er and a leading zero anticipator (LZA) each coupled to the PKG generator;
   a rounding control unit coupled to the LZA;
   a multiplexor coupled to each of the adder, the plus-oner, the plus-two-er and the rounding control unit; and
   and a normalization shifter coupled to a output of the multiplexor and the LZA.

2. The significand portion of claim 1 wherein the multiplier outputs a sum value and a carry value.

3. The significand portion of claim 2 wherein the PKG generator computes a propagate value (P), a kill value (K) and a generate value (G) based on the sum value and the carry value.

4. The significand portion of claim 3 wherein in parallel the adder adds the sum value and the carry value using P, K, and G; the plus-oner adds the sum value and the carry value using P, K, and G and increments by one; and the plus-two-er adds the sum value and the carry value using P, K, and G and increments by two.

5. The significand portion of claim 4 wherein the LZA computes in parallel with the adder, the plus-oner, and the plus-two-er.

6. The significand portion of claim 1 wherein the rounding control unit reads a rounding mode from a register in a processor in which the FMAC resides.

7. The significand portion of claim 1 wherein the normalization shifter and the rounding control unit each receive a leading zero position indication from the LZA.

8. The significand portion of claim 1 wherein the multiplexor produces an output result responsive to the rounding control unit.

9. A floating point multiply accumulator (FMAC) comprising:
   a multiplier;
   a propagate, kill, generate generator (PKG generator) to produce a propagate value (P), a kill value (K) and a generate value (G) coupled to the multiplier;
   an adder, a plus-oner, a plus-two-er and a leading zero anticipator (LZA) each coupled to the PKG generator in parallel;
   a rounding control unit coupled to the LZA and coupled to a multiplexor the multiplexor outputting a result from one of the adder, the plus-oner, and the plus-two-er responsive to the rounding control unit; and
   and a normalization shifter coupled to an output of the multiplexor and the LZA.

10. The FMAC of claim 9 wherein the multiplier produces a product of a first floating point number and a second floating point number added to a third floating point number as a sum value and a carry value.

11. The FMAC of claim 10 wherein in parallel the adder adds the sum value and the carry value using P, K, and G; the plus-oner adds the sum value and the carry value using P, K, and G and increments by one; and the plus-two-er adds the sum value and the carry value using P, K, and G and increments by two.

12. The FMAC of claim 9 wherein the rounding control unit outputs a select signal to the multiplexor based on a rounding mode and the decimal point position.

13. The FMAC of claim 9 wherein the normalization shifter normalizes based on the decimal point position.

14. A floating point multiply accumulator (FMAC) comprising:
   a means for multiplying a first significand and a second significand and adding a third significand to produce a sum value and a carry value;
   a means for computing a propagate value, a kill value, and a generate value coupled to the means for multiplying;
   a first means for adding the sum value to the carry value;
   a second means for adding the sum value to the carry value and incrementing by one;
   a third means for adding the sum value to the carry value and incrementing by two;
   a means for determining a leading zero position, such that the first means for adding, the second means for adding, the third means for adding, and the means for determining are coupled in parallel to the means for computing;
   a means for controlling responsive to the means for determining and a rounding mode, the means for controlling further coupled to a means for selecting, the means for selecting outputting a result from one of the first means for adding the second means for adding, and the third means for adding responsive to the means for controlling; and
   a means for normalizing coupled to an output of the means for selecting and the means for determining.

15. The FMAC of claim 14 wherein the means for controlling reads the rounding mode from a register in a processor in which the FMAC resides.

16. The FMAC of claim 14 wherein the means for normalizing is responsive to the means for determining.

17. A method in a floating point multiply accumulator (FMAC) comprising:
   receiving a first floating point number, a second floating point number and a third floating point number;
   computing a product of the first floating point number and the second floating point number and adding a third floating point number to produce a sum value and a carry value;
   computing a propagate value, a kill value and a generate value based on the sum value and the carry value;
   simultaneously adding the sum value to the carry value to create a first result, adding the sum value to the carry value and incrementing by one to create a second result, adding the sum value to the carry value and incrementing by two to create a third result, and determining a decimal point position;
   selecting one of the first result, the second result and the third result responsive to a rounding mode and the decimal point position as a selected result; and normalizing the selected result based on the decimal point position.

18. The method of claim 17 further comprising;
reading the rounding mode from a register in a processor in which the FMAC resides.

19. The method of claim 17 wherein normalizing comprises:
shifting the bits in the selected result.

20. The method of claim 17 wherein the propagate value, the kill value and the generate value are used by the adder, the plus-oner and the plus-two-er to compute the first result, the second result and the third result.

21. A machine readable medium containing instructions which, when executed by a processor, cause a machine to perform operations comprising:
receiving a first floating point number, a second floating point number and a third floating point number;
computing a product of the first floating point number and the second floating point number and adding a third floating point number to produce a sum value and a carry value;
computing a propagate value, a kill value and a generate value based on the sum value and the carry value;
simultaneously adding the sum value to the carry value to create a first result, adding the sum value to the carry value and incrementing by one to create a second result, adding the sum value to the carry value and incrementing by two to create a third result, and determining a decimal point position;
selecting one of the first result, the second result and the third result responsive to a rounding mode and the decimal point position as a selected result; and
normalizing the selected result based on the decimal point position.

22. The machine readable medium of claim 21 containing instructions which, when executed by a processor, cause the machine to perform further operations comprising:
reading the rounding mode from a register in a processor in which the FMAC resides.

23. The machine readable medium of claim 21 wherein normalizing comprises:
shifting the bits in the selected result.

* * * * *

UNITED STATES PATENT AND TRADEMARK OFFICE
CERTIFICATE OF CORRECTION

PATENT NO. : 6,820,106 B1
DATED : November 16, 2004
INVENTOR(S) : Vijayrao et al.

It is certified that error appears in the above-identified patent and that said Letters Patent is hereby corrected as shown below:

Column 4,
Line 37, after "K and", insert -- G --.

Column 5,
Line 28, delete the second occurrence of "a" and insert -- an --.

Signed and Sealed this

Twenty-fourth Day of May, 2005

JON W. DUDAS
*Director of the United States Patent and Trademark Office*